United States Patent Office 2,928,767
Patented Mar. 15, 1960

2,928,767

STABILIZED PHENOTHIAZINE PREPARATIONS

John J. Gulesich, Philadelphia, and Joseph A. Marlino, Secane, Pa., assignors to Smith Kline & French Laboratories, Philadelphia, Pa., a corporation of Pennsylvania No Drawing. Application July 17, 1957
Serial No. 672,341

8 Claims. (Cl. 167—52)

This invention relates to light-stable phenothiazine preparations. More specifically, this invention relates to phenothiazine preparations stabilized to light by the presence of saccharin or a soluble saccharin derivative.

Light such as ordinary daylight causes the phenothiazine nucleus to decompose and change color at a substantial rate. The potency and color of compounds containing a phenothiazine nucleus are in this manner materially affected. This is a marked deficiency in these compounds which have a wider variety of uses and is particularly troublesome in the medicinal and veterinary fields where they are widely employed variously as antiemetics, tranquilizers, sedatives, antihistaminics, antispasmodics and anthelmintics for cattle or for delicing poultry. The problem is particularly acute when the compound containing the phenothiazine nucleus is in an aqueous solution or otherwise exposed to a substantial amount of moisture as in wet granulation tabletting.

This problem has now been solved by the present invention which comprises a preparation containing, as its essential ingredients, a compound containing a phenothiazine nucleus (hereinafter referred to in the specification and claims as a "phenothiazine nucleus compound") and saccharin or, preferably, a soluble saccharin derivative for instance an ammonium, magnesium, calcium or alkali metal salt such as the sodium or potassium salt in an amount to light-stabilize the phenothiazine. The soluble derivatives are preferred for use in aqueous preparations and advantageously are as soluble in water as saccharin itself.

The proportion of the phenothiazine nucleus compound to saccharin may vary from about 1:1 to about 1000:1, advantageously from about 5:1 to about 500:1. Only a very small amount of the saccharin component is necessary to exert a substantial light stabilizing influence on the phenothiazine nucleus compound.

The phenothiazine nucleus compound, for example, can be phenothiazine or phenothiazine variously substituted such as 10-aminoalkylphenothiazines optionally substituted in a benzenoid ring of the nucleus. Such substituted phenothiazine compounds are exemplified by the therapeutically effective compounds variously having tranquilizing, antiemetic, sedative, antihistaminic, antispasmodic and anthelmintic activity and having the following general formula:

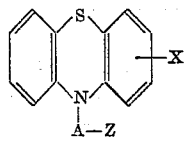

when:
X is a simple moiety such as hydrogen, halogen, lower alkyl, lower alkoxy, carbalkoxy, di-lower-alkyl-sulfamyl, lower alkylthio, trifluoromethyl or lower alkanoyl such as acetyl;
A is a straight or branched lower alkylene chain separating the nitrogen atoms to which it is attached by at least 2 carbons;
Z is a basic terminal group, for example, di-lower-alkylamino such as dimethylamino, diethylamino or dibutylamino or a five to seven-membered heterocyclic amino group such as N-lower-alkylpiperazinyl such as N-methylpiperazinyl or N-propylpiperazinyl, nortropinyl, piperidinyl, N-lower-alkylpiperidinyl such as N-methylpiperidinyl or N-propylpiperidinyl, N-hydroxy-lower-alkylpiperazinyl such as N-hydroxypropylpiperazinyl, N-hydroxyethylpiperazinyl, N-hydroxy-lower-alkoxy-lower-alkylpiperazinyl such as N-hydroxypropoxypropylpiperazinyl or N-hydroxyethoxyethylpiperazinyl or N-lower-alkanoyloxy-lower-alkylpiperazinyl such as N-acetoxybutylpiperazinyl or N-acetoxyethylpiperazinyl.

Where the term "lower" is used to modify a group, it is preferred that the group have not over 6 carbon atoms.

The phenothiazine nucleus compound of the light-stable combination of this invention may advantageously be 2 - chloro - 10 - (3 - dimethylaminopropyl)phenothiazine (chlorpromazine),
10-(3-dimethylaminopropyl)phenothiazine (promazine),
2-chloro-10-[3-(1-methyl-4-piperazinyl)propyl] - phenothiazine (prochlorperazine),
2-chloro-10-[3'-(N'-2 - hydroxyethylpiperazinyl)propyl]-phenothiazine (perphenazine),
10-(3-dimethylamino-2-methylpropyl)phenothiazine (trimeprazine),
2-methoxy-10-(3-dimethylamino-2 - methylpropyl) - phenothiazine (methotrimeprazine),
10-[(1-methyl-3-piperidyl)-methyl]phenothiazine (mepazine),
10-(2-diethylaminopropyl) - phenothiazine (ethopropazine) (ethpropazine),
2-chloro-10-[3'-(N'-2 - acetoxyethylpiperazinyl)propyl]-phenothiazine (acetylperphenazine),
2-methyl-10-(3 - dimethylaminopropyl) - phenothiazine (methylpromazine),
2-trifluoromethyl-10-(3 - dimethylaminopropyl)phenothiazine (triphentizine) (triflupromazine) (triflorpromazine),
10-[3-(1-methyl-4-piperazinyl)-propyl]-2 - trifluoromethylphenothiazine (trifluoperazine),
2-ethyl-10-(3-dimethylamino-2 - methylpropyl)phenothiazine (ethotrimeprazine),
10-(3-dimethylaminopropyl) - 2 - methoxyphenothiazine (methopromazine),
2-acetyl-10-(3-dimethylaminopropyl)phenothiazine (acetylpromazine),
10-(β-diethylaminoethyl)phenothiazine (diethazine).

The phenothiazine nucleus compound, if it is substituted by a basic aminoalkyl side chain, may also be any pharmaceutically-acceptable, nontoxic acid addition salt of the above bases, such as a salt with an organic acid, such as the tartrate, maleate or ethanedisulfonate or a salt with an inorganic acid, such as the hydrochloride, phosphate, hydrobromide or sulfate. When such salts are present in aqueous solution, it is often desirable to buffer the solution by adding the anion present in the salt.

The preparation of this invention can be in the form of a simple mixture of the essential ingredients or can contain other ingredients, for example, diluents or carriers such as, for example, water.

Where a therapeutically effective phenothiazine nucleus compound is employed, the preparation of this invention can be in a suitable pharmaceutical form such as a tablet or a hard gelatin capsule with the essential ingredients admixed with a carrier or diluent such as starch, talc, lactose, stearic acid or gelatin. Numerous other pharmaceutical forms can be employed, for example, the essential ingredients can be in a liquid carrier such as water, peanut oil or olive oil and, if desired, placed in a soft gelatin capsule.

The preferred pharmaceutical form is an aqueous solution for oral or parenteral use. Whether for oral or parenteral use, conventional pharmaceutical additives can be employed. Thus, for example, a parenteral preparation may contain preservatives such as benzyl alcohol or methyl p-hydroxybenzoate, buffering agents and salts to bring the injectable preparation to a satisfactory pH, or other stabilizing agents such as ascorbic acid or sodium bisulfite. Similarly, an oral preparation may contain stabilizing agents such as antioxidants.

In a pharmaceutical preparation, the phenothiazine nucleus compound may be present in any proportions desired by the dosage requirement of the final product, considering in the case of aqueous preparations, the limitations of solubility. The amount of the therapeutically effective phenothiazine nucleus compound advantageously will be from about 0.1 to about 10%, preferably from about 0.3 to about 5%, by weight of the preparation.

The saccharin component of the preparation may be present as saccharin itself or a soluble saccharin derivative such as soluble salts which are nontoxic and pharmaceutically acceptable, such as the ammonium, magnesium, calcium or preferably the alkali metal salts, for instance the sodium or potassium salts. It is preferred to use soluble derivatives of saccharin which are as soluble in water as saccharin itself. Advantageously from about 0.01 to about 10% (by weight of the preparation) of the saccharin component will be present in the final product, depending on the solubility of the saccharin derivative used. Preferably in solutions for parenteral use this component will be from about 0.05 to about 1% by weight to volume of solution.

The preparations of this invention are readily prepared by obvious methods of variously mixing and dissolving the ingredients as appropriate to the desired end product.

The preparations of this invention are illustrated by the following examples of pharmaceutical preparations which are not limiting as to the scope of this invention.

Example 1

| | Gm. |
|---|---|
| Trifluoperazine dihydrochloride | [1] 0.59 |
| Sodium saccharin, U.S.P | 0.13 |
| Sodium biphosphate, U.S.P | 0.87 |
| Sodium tartrate, reagent | 1.30 |
| Water for injection, U.S.P., q.s. ad 100.0 ml. | |

[1] Equivalent to 5 mg./ml. of base.

Dissolve the sodium biphosphate and sodium tartrate in 50% of the water, add and dissolve the trifluoperazine dihydrochloride, dissolve the sodium saccharin in 30% portion of the water, add to the buffered drug solution, adjust to final volume with water for injection, filter through bacteriological filter, fill into 2 ml. flint ampuls; seal ampuls and autoclave.

Example 2

| | Gm. |
|---|---|
| Prochlorperazine ethanedisulfonate | [1] 0.75 |
| Sodium saccharin, U.S.P | 0.09 |
| Sodium biphosphate, U.S.P | 0.50 |
| Sodium tartrate, reagent | 1.20 |
| Benzyl alcohol, reagent | 0.75 |
| Water for injection, U.S.P., q.s. ad 100.0 ml. | |

[1] Equivalent to 5 mg./ml. of base.

Dissolve the benzyl alcohol in 50% of the water, add and dissolve the sodium biphosphate, prochlorperazine ethanedisulfonate and sodium tartrate, dissolve the sodium saccharin in a separate 30% portion of water and add, adjust the final volume to 100.0 ml., filter, fill into 13 ml. amber vials, stopper with black rubber stoppers, seal and autoclave.

Example 3

| | Gm. |
|---|---|
| Chlorpromazine hydrochloride | 2.50 |
| Sodium saccharin | 0.200 |
| Sodium sulfite | 0.100 |
| Sodium bisulfite | 0.100 |
| Sodium chloride | 0.675 |
| Ascorbic acid | 0.200 |
| Water for injection, q.s. ad 100.0 ml. | |

Following the general procedures employed in the above examples, the following pharmaceutical preparations are made.

Example 4

| | Gm. |
|---|---|
| Trimeprazine tartrate | 3.125 |
| Sodium saccharin | 0.250 |
| Sodium sulfite | 0.250 |
| Tartaric acid | 0.250 |
| Water for injection, q.s. ad 100.0 ml. | |

Example 5

| | Gm. |
|---|---|
| Promazine hydrochloride | 4.50 |
| Sodium saccharin | 1.00 |
| Sodium sulfite | 0.100 |
| Sodium bisulfite | 0.100 |
| Sodium chloride | 0.675 |
| Ascorbic acid | 0.200 |
| Water for injection, q.s. ad 100.0 ml. | |

Example 6

| | Gm. |
|---|---|
| Perphenazine dihydrochloride | 0.65 |
| Sodium biphosphate | 0.50 |
| Sodium tartrate | 1.20 |
| Sodium saccharin | 0.09 |
| Benzyl alcohol | 0.75 |
| Water for injection, q.s. ad 100.0 ml. | |

Example 7

| | Gm. |
|---|---|
| Acetylperphenazine dihydrochloride (10-[3'-(N-acetoxyethyl)-piperazinylpropyl] - 2 - chlorophenothiazine) | 0.71 |
| Sodium biphosphate | 0.87 |
| Sodium tartrate | 1.30 |
| Sodium saccharin | 0.13 |
| Water for injection, q.s. ad 100.0 ml. | |

Example 8

| | Gm. |
|---|---|
| 10-(3'-dimethylamino-2'-methylpropyl)-2 - trifluoromethylpiperazine tartrate | 1.79 |
| Tartaric acid | 0.250 |
| Potassium saccharin | 0.300 |
| Sodium sulfite | 0.250 |
| Water for injection, q.s. ad 100.0 ml. | |

Example 9

| | Gm. |
|---|---|
| 10-[3'-(N-methylpiperazinyl)-2' - methylpropyl]-2-trifluoromethylphenothiazine dihydrochloride | 0.61 |
| Sodium saccharin | 0.13 |
| Sodium tartrate | 0.87 |
| Ascorbic acid | 1.30 |
| Water for injection, q.s. ad 100.0 ml. | |

Example 10

| | Gm. |
|---|---|
| Chlorpromazine hydrochloride | 2.50 |
| Saccharin | 0.05 |
| Sodium sulfite | 0.100 |
| Sodium bisulfite | 0.100 |
| Sodium chloride | 0.675 |
| Ascorbic acid | 0.200 |
| Water for injection, q.s. ad 100.0 ml. | |

Example 11

| | | |
|---|---|---|
| Chlorpromazine hydrochloride | gm | 0.20 |
| Soluble saccharin, U.S.P | gm | 0.10 |
| Sodium benzoate | gm | 0.05 |
| Citric acid | gm | 0.02 |
| Ascorbic acid | gm | 0.10 |
| Oil of orange | ml | 0.01 |
| Oil of custard flavor | ml | 0.050 |
| Sugar syrup | ml | 93.75 |
| Distilled water, q.s. ad 100.0 ml. | | |

Example 12

| | Mg./tablet |
|---|---|
| Prochlorperazine dimaleate | 16.21 |
| Terra alba | 219.00 |
| Sucrose | 50.00 |
| Sodium saccharin | 3.09 |

The above ingredients are thoroughly mixed and granulated with 15% gelatin solution.

| | |
|---|---|
| Starch | 17.00 |
| Talc | 5.00 |
| Stearic acid | 2.00 | are added and the mixture is compressed into tablets.

A typical preparation for veterinarian use is set forth below:

Example 13

| | Gm. |
|---|---|
| Phenothiazine | 1.0 |
| Bone meal | 1.0 |
| Sodium chloride | 1.0 |
| Saccharin | 0.20 |

The above ingredients are thoroughly mixed and filled into a hard gelatin capsule.

What is claimed is:

1. A light stable phenothiazine preparation comprising a member selected from the group consisting of a free base and its nontoxic pharmaceutically acceptable organic and inorganic acid addition salts, the free base having the formula:

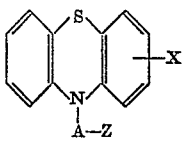

in which X is a member selected from the group consisting of hydrogen, halogen, lower alkyl, lower alkoxy, lower alkylthio, trifluoromethyl and lower alkanoyl, A represents a lower alkylene chain separating the nitrogen atom to which it is attached by at least 2 carbons and Z is a member selected from the group consisting of a di lower alkylamino, N-lower alkylpiperazinyl, nortropinyl, piperidinyl, N-lower-alkylpiperidinyl, N-hydroxy-lower-alkylpiperazinyl, N-hydroxy-lower-alkoxy-lower alkylpiperazinyl, N-lower-alkanoyloxy-lower-alkylpiperazinyl and a saccharin derivative selected from the group consisting of saccharin, ammonium saccharin, magnesium saccharin, calcium saccharin, and an alkali metal salt of saccharin, said saccharin derivative being present in an amount to make the phenothiazine member substantially stabilized to light.

2. An aqueous light-stable phenothiazine preparation comprising water, from about 0.1% to about 10% by weight of a member selected from the group consisting of a free base and its nontoxic pharmaceutically acceptable organic and inorganic acid addition salts, the free base having the formula:

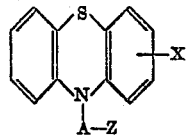

in which X is a member selected from the group consisting of hydrogen, halogen, lower alkyl, lower alkoxy, lower alkylthio, trifluoromethyl and lower alkanoyl, A represents a lower alkylene chain separating the nitrogen atom to which it is attached by at least 2 carbons and Z is a member selected from the group consisting of a di lower alkylamino, N-lower alkylpiperazinyl, nortropinyl, piperidinyl, N-lower-alkylpiperidinyl, N-hydroxy-lower-alkylpiperazinyl, N-hydroxy-lower-alkoxy-lower alkylpiperazinyl, N-lower-alkanoyloxy-lower-alkylpiperazinyl and about 0.01% to about 10% w./v. of a member selected from the group consisting of saccharin, ammonium saccharin, magnesium saccharin, calcium saccharin, and an alkali metal salt of saccharin.

3. An aqueous light-stable phenothiazine preparation comprising water, from about 0.3% to about 5% by weight of a member selected from the group consisting of a free base and its nontoxic pharmaceutically acceptable organic and inorganic acid addition salts, the free base having the formula:

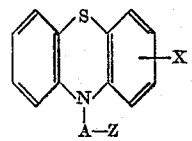

in which X is a member selected from the group consisting of hydrogen, halogen, lower alkyl, lower alkoxy, lower alkylthio, trifluoromethyl and lower alkanoyl, A represents a lower alkylene chain separating the nitrogen atom to which it is attached by at least 2 carbons and Z is a member selected from the group consisting of a di lower alkylamino, N-lower alkylpiperazinyl, nortropinyl, piperidinyl, N-lower-alkylpiperidinyl, N-hydroxy-lower-alkylpiperazinyl, N-hydroxy-lower-alkoxy-lower alkylpiperazinyl, N-lower-alkanoyloxy-lower-alkylpiperazinyl and about 0.05% to about 1% w./v. of a member selected from the group consisting of saccharin, ammonium saccharin, magnesium saccharin, calcium saccharin, and an alkali metal salt of saccharin.

4. An aqueous light-stable phenothiazine preparation comprising water, from about 0.3% to about 5% by weight of 2-chloro-10-[3-(1-methyl-4-piperazinyl)propyl]-phenothiazine and about 0.05% to about 1% w./v. of an alkali metal salt of saccharin.

5. An aqueous light-stable phenothiazine preparation comprising water, from about 0.3% to about 5% by weight of 10-[3-(1-methyl-4-piperazinyl)propyl]-2-trifluoromethylphenothiazine and about 0.05% to about 1% w./v. of an alkali metal salt of saccharin.

6. An aqueous light-stable phenothiazine preparation comprising water from about 0.3% to about 5% by weight of 10-(3-dimethylamino-2-methylpropyl)-phenothiazine and about 0.05% to about 1% w./v. of an alkali metal salt of saccharin.

7. An aqueous light-stable phenothiazine preparation comprising water from about 0.3% to about 5% by weight of 2-chloro-10-(3-dimethylaminopropyl)phenothiazine and about 0.05% to about 1% w./v. of an alkali metal salt of saccharin.

8. An aqueous light-stable phenothiazine preparation comprising water from about 0.3% to about 5% by weight of 2-chloro-10-[3'-(N'-2-hydroxyethylpiperazinyl)-propyl]phenothiazine and about 0.05% to about 1% w./v. of an alkali metal salt of saccharin.

References Cited in the file of this patent

UNITED STATES PATENTS

| | | |
|---|---|---|
| 2,112,381 | Salzberg | Mar. 29, 1938 |
| 2,123,928 | Bousquet | July 19, 1938 |
| 2,123,929 | Bousquet | July 19, 1938 |
| 2,455,611 | Schlattman | Dec. 7, 1948 |
| 2,455,612 | Schlattman | Dec. 7, 1948 |
| 2,455,613 | Schlattman | Dec. 7, 1948 |
| 2,455,614 | Schlattman | Dec. 7, 1948 |
| 2,716,117 | Boker | Aug. 23, 1955 |
| 2,799,619 | Seifter | July 16, 1957 |